United States Patent
Baghel et al.

(10) Patent No.: US 10,412,571 B2
(45) Date of Patent: Sep. 10, 2019

(54) CONFIGURATION BY ENB FOR D2D UE TO NETWORK RELAY SEARCH

(71) Applicant: QUALCOMM Incorporated, San Diego, CA (US)

(72) Inventors: Sudhir Kumar Baghel, Bridgewater, NJ (US); Shailesh Patil, Raritan, NJ (US); Saurabha Rangrao Tavildar, Jersey City, NJ (US); Hong Cheng, Basking Ridge, NJ (US); Michaela Vanderveen, Tracy, CA (US); Haris Zisimopoulos, London (GB); Bilal Sadiq, Basking Ridge, NJ (US); Kapil Gulati, Franklin Park, NJ (US)

(73) Assignee: Qualcomm Incorporated, San Diego, CA (US)

( * ) Notice: Subject to any disclaimer, the term of this patent is extended or adjusted under 35 U.S.C. 154(b) by 180 days.

(21) Appl. No.: 15/061,896

(22) Filed: Mar. 4, 2016

(65) Prior Publication Data
US 2016/0286374 A1    Sep. 29, 2016

Related U.S. Application Data

(60) Provisional application No. 62/137,767, filed on Mar. 24, 2015.

(51) Int. Cl.
*H04W 8/00* (2009.01)
*H04W 24/10* (2009.01)
(Continued)

(52) U.S. Cl.
CPC .......... *H04W 8/005* (2013.01); *H04B 17/318* (2015.01); *H04W 24/10* (2013.01);
(Continued)

(58) Field of Classification Search
CPC . H04W 4/008; H04W 4/023; H04W 52/0216; H04W 52/0229; H04W 88/04; H04W 8/005; H04W 48/14; Y02B 60/50
See application file for complete search history.

(56) References Cited

U.S. PATENT DOCUMENTS

| 2012/0230247 A1 | 9/2012 | Kwon et al. |
| 2015/0029866 A1* | 1/2015 | Liao ...................... H04W 4/023 370/241 |

(Continued)

FOREIGN PATENT DOCUMENTS

EP    2833694 A2    2/2015

OTHER PUBLICATIONS

International Search Report and Written Opinion—PCT/US2016/021270—ISA/EPO—dated May 30, 2016.
(Continued)

*Primary Examiner* — Awet Haile
(74) *Attorney, Agent, or Firm* — Arent Fox, LLP

(57) ABSTRACT

A method, a computer-readable medium, and an apparatus are provided. The apparatus may be a user equipment (UE). The apparatus may transmit, to a base station, information indicating a capability to communicate with one or more relay UEs. In addition, the apparatus may receive, from the base station, configuration information associated with a discovery procedure for identifying the one or more relay UEs. Further, the apparatus may perform the discovery procedure based on the configuration information.

28 Claims, 9 Drawing Sheets

(51) Int. Cl.
*H04B 17/318* (2015.01)
*H04W 76/14* (2018.01)
H04W 88/04 (2009.01)
H04W 48/16 (2009.01)
H04W 48/12 (2009.01)
H04W 48/08 (2009.01)

(52) U.S. Cl.
CPC ............ *H04W 76/14* (2018.02); *H04W 48/08* (2013.01); *H04W 48/12* (2013.01); *H04W 48/16* (2013.01); *H04W 88/04* (2013.01)

(56) References Cited

U.S. PATENT DOCUMENTS

| | | | | |
|---|---|---|---|---|
| 2015/0230114 | A1* | 8/2015 | Delsol | H04W 36/0094 370/252 |
| 2015/0264677 | A1* | 9/2015 | He | H04W 72/02 370/312 |
| 2017/0215098 | A1* | 7/2017 | Huang | H04W 24/10 |

OTHER PUBLICATIONS

NEC: "ProSe Relay discovery assisted by E-UTRAN," 3GPP Draft; S2-133376 Prose Relay V0-2, 3rd Generation Partnership Project (3GPP), Mobile Competence Centre ; 650, Route Des Lucioles ; F-06921 Sophia-Antipolis Cedex ; France 2 vol. SA WG2, No. Xiamen, P.R. China; Sep. 23, 2013-Sep. 27, 2013 Sep. 18, 2013 (Sep. 18, 2013), XP050726730, Retrieved from the Internet: URL:http://www.3gpp.org/ftp/tsg_sa/WG2_Arc h/TSGS2_99_Xiamen/Docs/ [retrieved on Sep. 18, 2013], 4 pages.

ZTE: "ProSe UE capability," 3GPP Draft; R2-144461 Prose Ue Capability, 3rd Generation Partnership Project (3GPP), Mobile Competence Centre ; 650, Route Des Lucioles ; F-06921 Sophia-Antipolis Cedex ; France vol. RAN WG2, No. Shanghai, P.R. China; Oct. 6, 2014-Oct. 10, 2014.

* cited by examiner

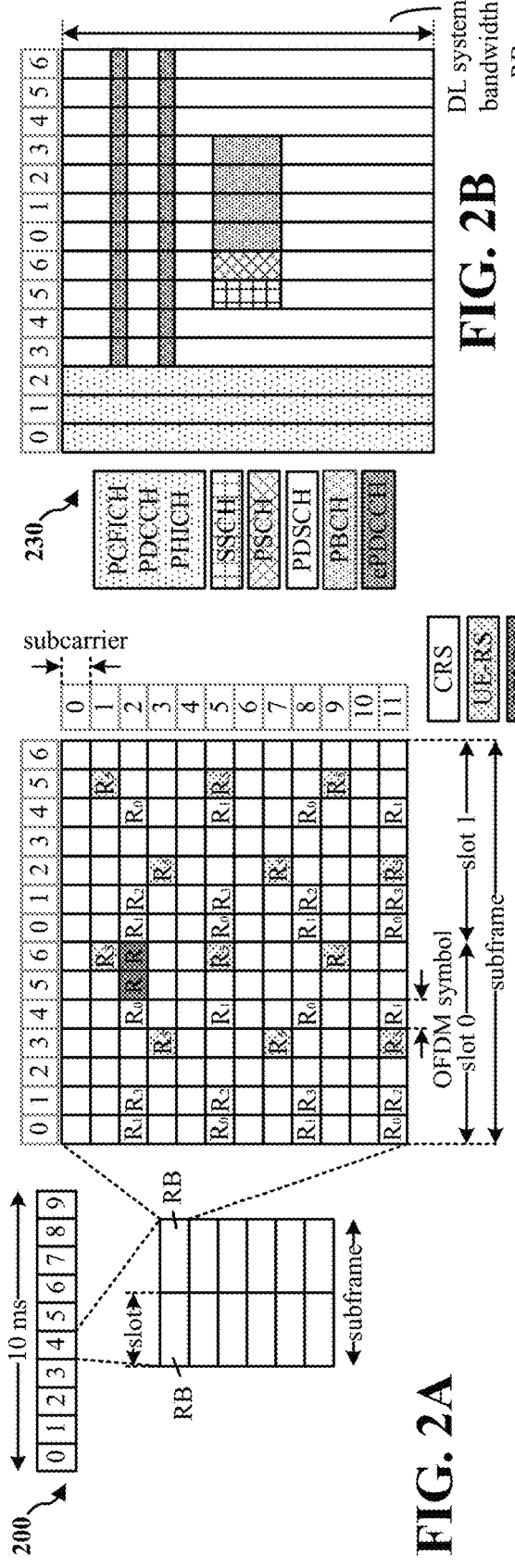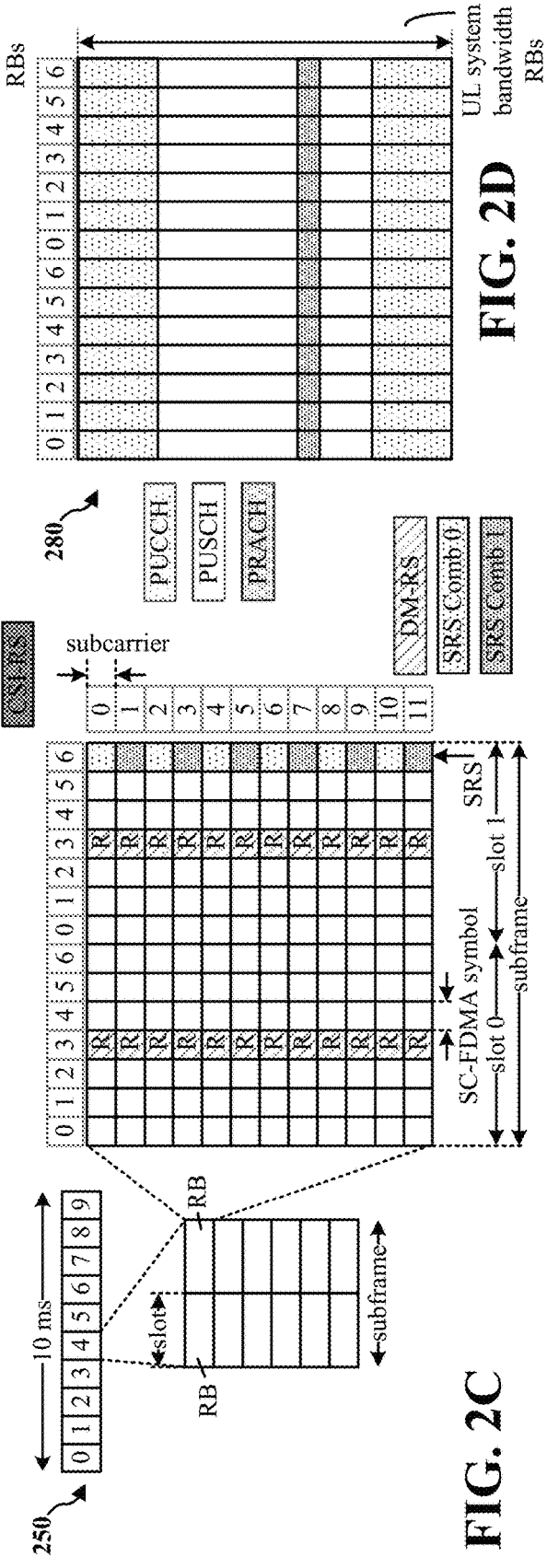
FIG. 2A  FIG. 2B  FIG. 2C  FIG. 2D

CONFIGURATION BY ENB FOR D2D UE TO NETWORK RELAY SEARCH

CROSS-REFERENCE TO RELATED APPLICATIONS

This application claims the benefit of U.S. Provisional Application Ser. No. 62/137,767, entitled "Configuration by eNB for D2D UE Network Relay Search" and filed on Mar. 24, 2015, which is expressly incorporated by reference herein in its entirety.

BACKGROUND

Field

The present disclosure relates generally to communication systems, and more particularly, to configuration of a device-to device (D2D) UE by a base station for performing a network relay search.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to support mobile broadband access through improved spectral efficiency, lowered costs, and improved services using OFDMA on the downlink, SC-FDMA on the uplink, and multiple-input multiple-output (MIMO) antenna technology. However, as the demand for mobile broadband access continues to increase, there exists a need for further improvements in LTE technology. These improvements may also be applicable to other multi-access technologies and the telecommunication standards that employ these technologies.

One improvement is for LTE to be configured to support device-to-device (D2D) communication, which may involve direct communication between UEs in addition to eNB communication. In some circumstances, a UE may be at the fringe of a cell or outside a cell and unable to communicate with an eNB. At the same time, the UE may still be located within range of D2D communication of one or more UEs that are positioned within range of the eNB. As such, LTE and in particular D2D would benefit from at least one of one or more UEs to relay communications from the eNB to the UE positioned at the fringe of a cell or outside a cell.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a user equipment (UE). The apparatus transmits, to a base station, information indicating a capability to communicate with one or more relay UEs. In addition, the apparatus receives, from the base station, configuration information associated with a discovery procedure for identifying the one or more relay UEs. Further, the apparatus performs the discovery procedure based on the configuration information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating LTE examples of a DL frame structure, DL channels within the DL frame structure, an UL frame structure, and UL channels within the UL frame structure, respectively.

DETAILED DESCRIPTION

Figure 1:
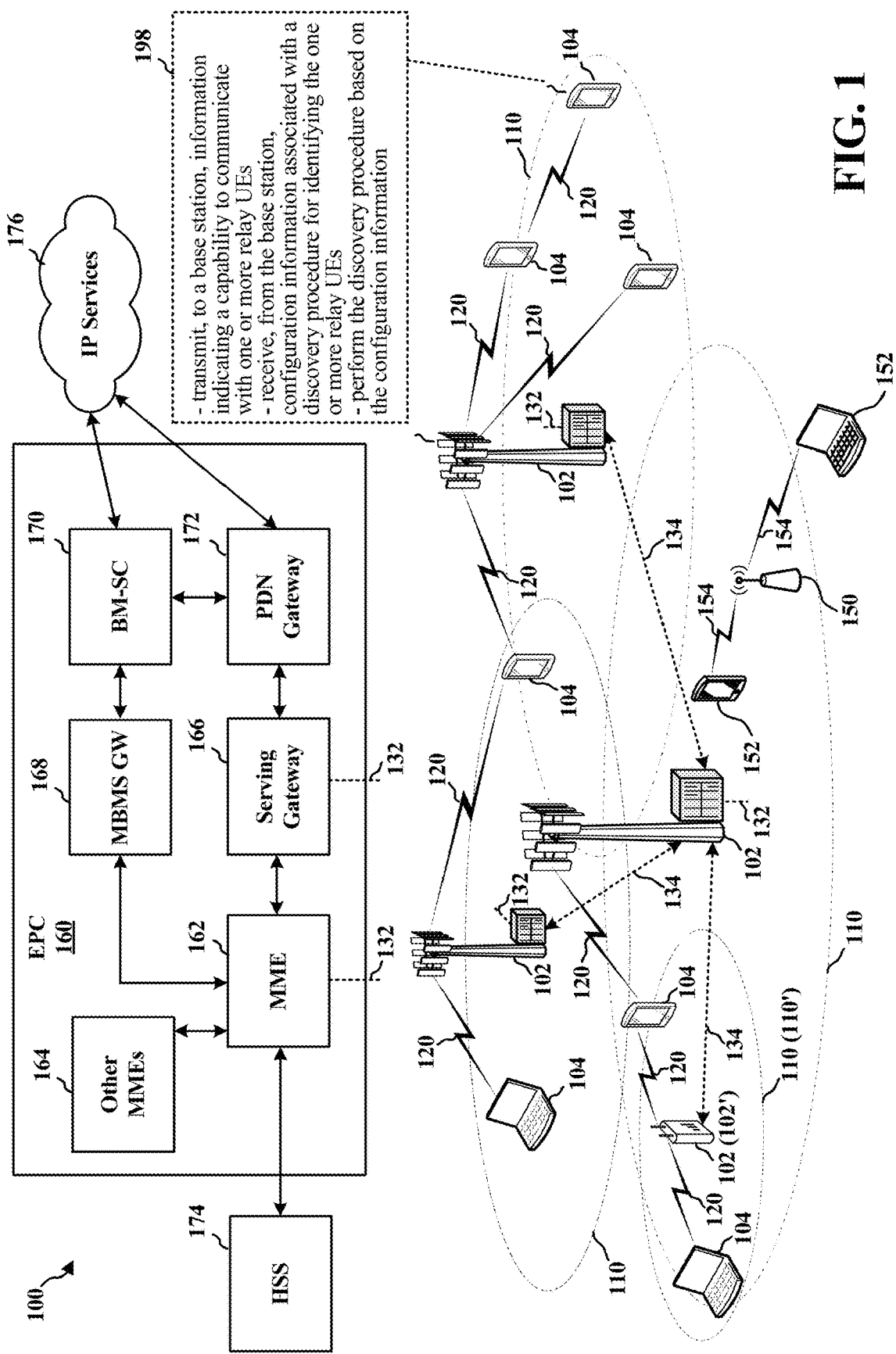
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media may include transitory or non-transitory computer storage media for carrying or having computer-executable instructions or data structures stored thereon. Both transitory and non-transitory storage media may be any available media that can be accessed by a computer as part of the processing system. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer. Further, when information is transferred or provided over a network or another communications connection (either hardwired, wireless, or combination thereof) to a computer, the computer or processing system properly determines the connection as a transitory or non-transitory computer-readable medium, depending on the particular medium. Thus, any such connection is properly termed a computer-readable medium. Combinations of the above should also be included within the scope of the computer-readable media. Non-transitory computer-readable media excludes signals per se and the air interface.

FIG. 1 is a diagram illustrating an example of a wireless communications system and an access network 100. The wireless communications system 100 (also referred to as a wireless wide area network (WWAN)) includes base stations 102, UEs 104, and an Evolved Packet Core (EPC) 160. The base stations 102 may include macro cells (high power cellular base station) and/or small cells (low power cellular base station). The macro cells include eNBs. The small cells include femtocells, picocells, and microcells.

The base stations 102 (collectively referred to as Evolved Universal Mobile Telecommunications System (UMTS) Terrestrial Radio Access Network (E-UTRAN)) interface with the EPC 160 through backhaul links 132 (e.g., S1 interface). In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links may be through one or more carriers. The base stations 102/UEs 104 may use spectrum up to Y MHz (e.g., 5, 10, 15, 20 MHz) bandwidth per carrier allocated in a carrier aggregation of up to a total of Yx MHz (x component carriers) used for transmission in each direction. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

The wireless communications system 100 may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ LTE and use the same 5 GHz unlicensed frequency spectrum as used by the Wi-Fi AP 150. The small cell 102', employing LTE in an unlicensed frequency spectrum, may boost coverage to and/or increase capacity of the access network. LTE in an unlicensed spectrum may be referred to as LTE-unlicensed (LTE-U), licensed assisted access (LAA), or MuLTEfire.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service (PSS), and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The base station may also be referred to as a Node B, an access point, a base transceiver station, a radio base station, a radio transceiver, a transceiver function, a basic service set (BSS), an extended service set (ESS), or some other suitable terminology. The eNB 102 provides an access point to the EPC 160 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, or any other similar functioning device. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

FIG. 2A is a diagram 200 illustrating an example of a DL frame structure in LTE. FIG. 2B is a diagram 230 illustrating an example of channels within the DL frame structure in LTE. FIG. 2C is a diagram 250 illustrating an example of an UL frame structure in LTE. FIG. 2D is a diagram 280 illustrating an example of channels within the UL frame structure in LTE. Other wireless communication technologies may have a different frame structure and/or different channels. In LTE, a frame (10 ms) may be divided into 10 equally sized subframes. Each subframe may include two consecutive time slots. A resource grid may be used to represent the two time slots, each time slot including one or more time concurrent resource blocks (RBs) (also referred to as physical RBs (PRBs)). The resource grid is divided into multiple resource elements (REs). In LTE, for a normal cyclic prefix, an RB contains 12 consecutive subcarriers in the frequency domain and 7 consecutive symbols (for DL, OFDM symbols; for UL, SC-FDMA symbols) in the time domain, for a total of 84 REs. For an extended cyclic prefix, an RB contains 12 consecutive subcarriers in the frequency domain and 6 consecutive symbols in the time domain, for a total of 72 REs. The number of bits carried by each RE depends on the modulation scheme.

As illustrated in FIG. 2A, some of the REs carry DL reference (pilot) signals (DL-RS) for channel estimation at the UE. The DL-RS may include cell-specific reference signals (CRS) (also sometimes called common RS), UE-specific reference signals (UE-RS), and channel state information reference signals (CSI-RS). FIG. 2A illustrates CRS for antenna ports 0, 1, 2, and 3 (indicated as $R_0$, $R_1$, $R_2$, and $R_3$, respectively), UE-RS for antenna port 5 (indicated as $R_5$), and CSI-RS for antenna port 15 (indicated as R). FIG. 2B illustrates an example of various channels within a DL subframe of a frame. The physical control format indicator channel (PCFICH) is within symbol 0 of slot 0, and carries a control format indicator (CFI) that indicates whether the physical downlink control channel (PDCCH) occupies 1, 2, or 3 symbols (FIG. 2B illustrates a PDCCH that occupies 3 symbols). The PDCCH carries downlink control information (DCI) within one or more control channel elements (CCEs), each CCE including nine RE groups (REGs), each REG including four consecutive REs in an OFDM symbol. A UE may be configured with a UE-specific enhanced PDCCH (ePDCCH) that also carries DCI. The ePDCCH may have 2, 4, or 8 RB pairs (FIG. 2B shows two RB pairs, each subset including one RB pair). The physical hybrid automatic repeat request (ARQ) (HARQ) indicator channel (PHICH) is also within symbol 0 of slot 0 and carries the HARQ indicator (HI) that indicates HARQ acknowledgement (ACK)/negative ACK (HACK) feedback based on the physical uplink shared channel (PUSCH). The primary synchronization channel (PSCH) is within symbol 6 of slot 0 within subframes 0 and 5 of a frame, and carries a primary synchronization signal (PSS) that is used by a UE to determine subframe timing and a physical layer identity. The secondary synchronization channel (SSCH) is within symbol 5 of slot 0 within subframes 0 and 5 of a frame, and carries a secondary synchronization signal (SSS) that is used by a UE to determine a physical layer cell identity group number. Based on the physical layer identity and the physical layer cell identity group number, the UE can determine a physical cell identifier (PCI). Based on the PCI, the UE can determine the locations of the aforementioned DL-RS. The physical broadcast channel (PBCH) is within symbols 0, 1, 2, 3 of slot 1 of subframe 0 of a frame, and carries a master information block (MIB). The MIB provides a number of RBs in the DL system bandwidth, a PHICH configuration, and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry demodulation reference signals (DM-RS) for channel estimation at the eNB. The UE may additionally transmit sounding reference signals (SRS) in the last symbol of a subframe. The SRS may have a comb structure, and a UE may transmit SRS on one of the combs. The SRS may be used by an eNB for channel quality estimation to enable frequency-dependent scheduling on the UL. FIG. 2D illustrates an example of various channels within an UL subframe of a frame. A physical random access channel (PRACH) may be within one or more subframes within a frame based on the PRACH configuration. The PRACH may include six consecutive RB pairs within a subframe. The PRACH allows the UE to perform initial system access and achieve UL synchronization. A physical uplink control channel (PUCCH) may be located on edges of the UL system bandwidth. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
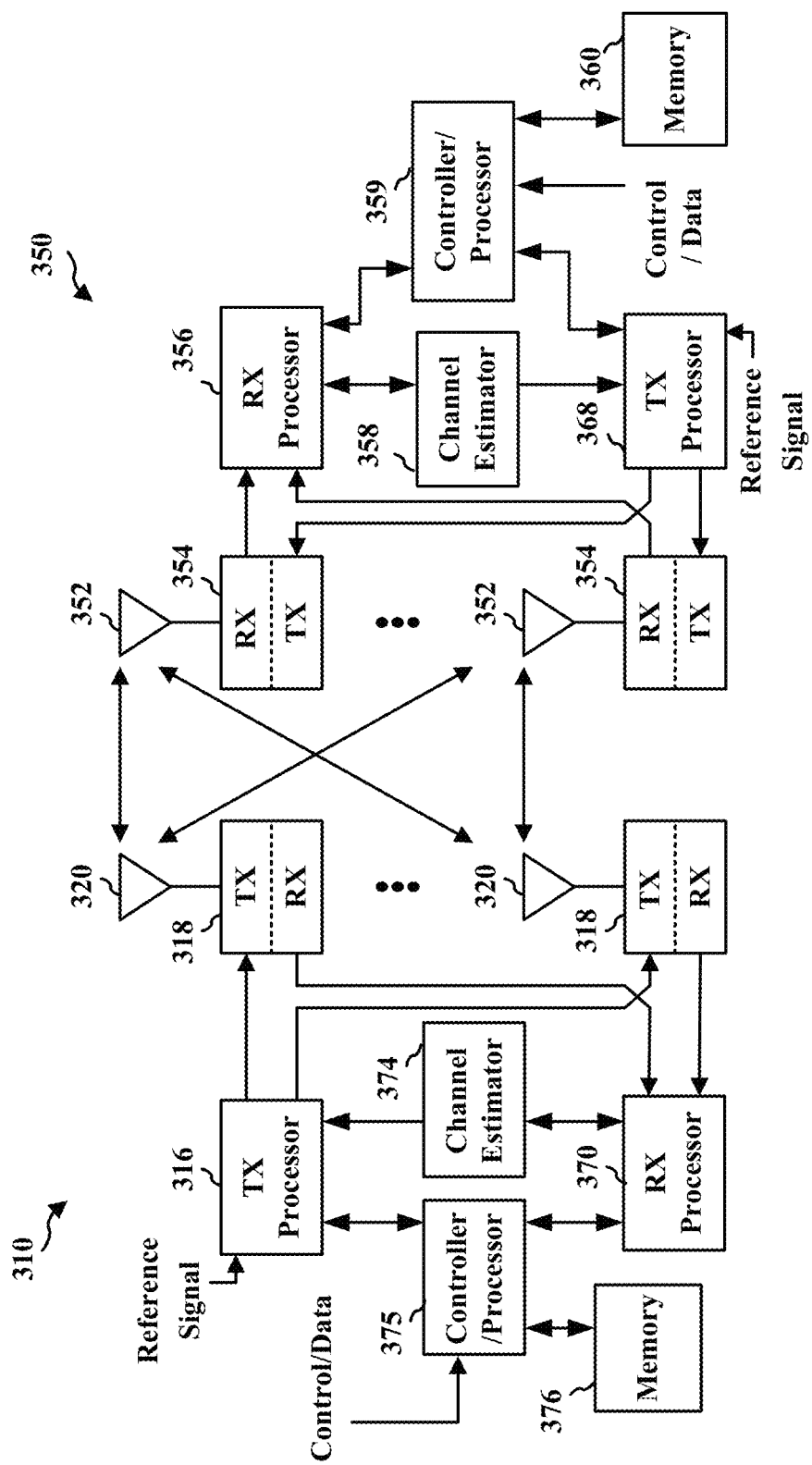
FIG. 3 is a diagram illustrating an example of an evolved Node B (eNB) and user equipment (UE) in an access network.

FIG. 3 is a block diagram of an eNB 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demuliplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 310. These soft decisions may be based on channel estimates computed by the channel estimator 358. The soft decisions are then decoded and deinterleaved to recover the data and control signals that were originally transmitted by the eNB 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the eNB 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demuliplexing of MAC SDUs from TBs, scheduling information reporting, error correction through HARQ, priority handling, and logical channel prioritization.

Channel estimates derived by a channel estimator 358 from a reference signal or feedback transmitted by the eNB 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the eNB 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

Figure 4:
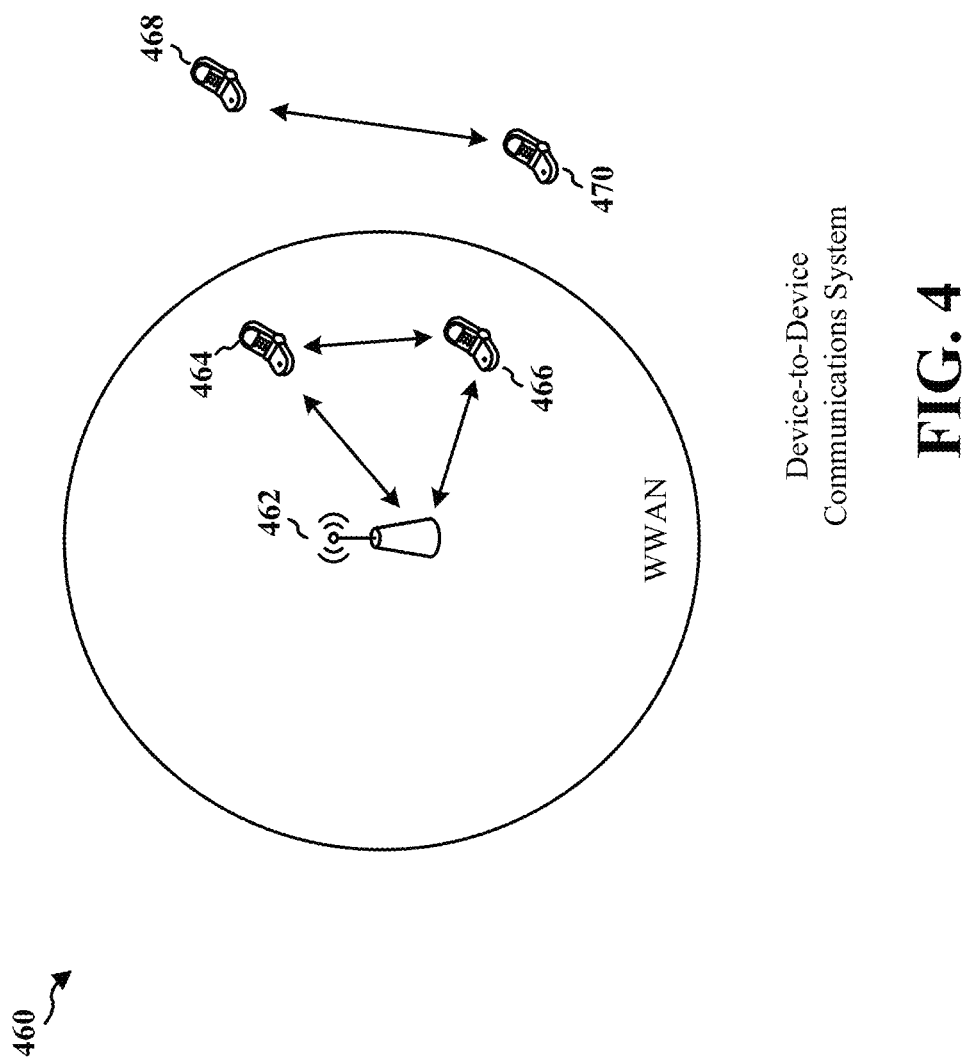
FIG. 4 is a diagram of a device-to-device communications system.

FIG. 4 is a diagram of a device-to-device (D2D) communications system 460. The D2D communications system 460 includes a plurality of UEs 464, 466, 468, 470. The D2D communications system 460 may overlap with a cellular communications system, such as for example, a WWAN. Some of the UEs 464, 466, 468, 470 may communicate together in D2D communication using the DL/UL WWAN spectrum, some may communicate with the base station 462, and some may do both. For example, as shown in FIG. 4, the UEs 468, 470 are in D2D communication and the UEs 464, 466 are in D2D communication. The UEs 464, 466 are also communicating with the base station 462. The D2D communication may be through one or more sidelink channels, such as a physical sidelink broadcast channel (PSBCH), a physical sidelink discovery channel (PSDCH), a physical sidelink shared channel (PSSCH), and a physical sidelink control channel (PSCCH).

The exemplary methods and apparatuses discussed infra are applicable to any of a variety of wireless D2D communications systems, such as for example, a wireless device-to-device communication system based on FlashLinQ, WiMedia, Bluetooth, ZigBee, or Wi-Fi based on the IEEE 802.11 standard. To simplify the discussion, the exemplary methods and apparatus are discussed within the context of LTE. However, one of ordinary skill in the art would understand that the exemplary methods and apparatuses are applicable more generally to a variety of other wireless device-to-device communication systems.

Figure 5:
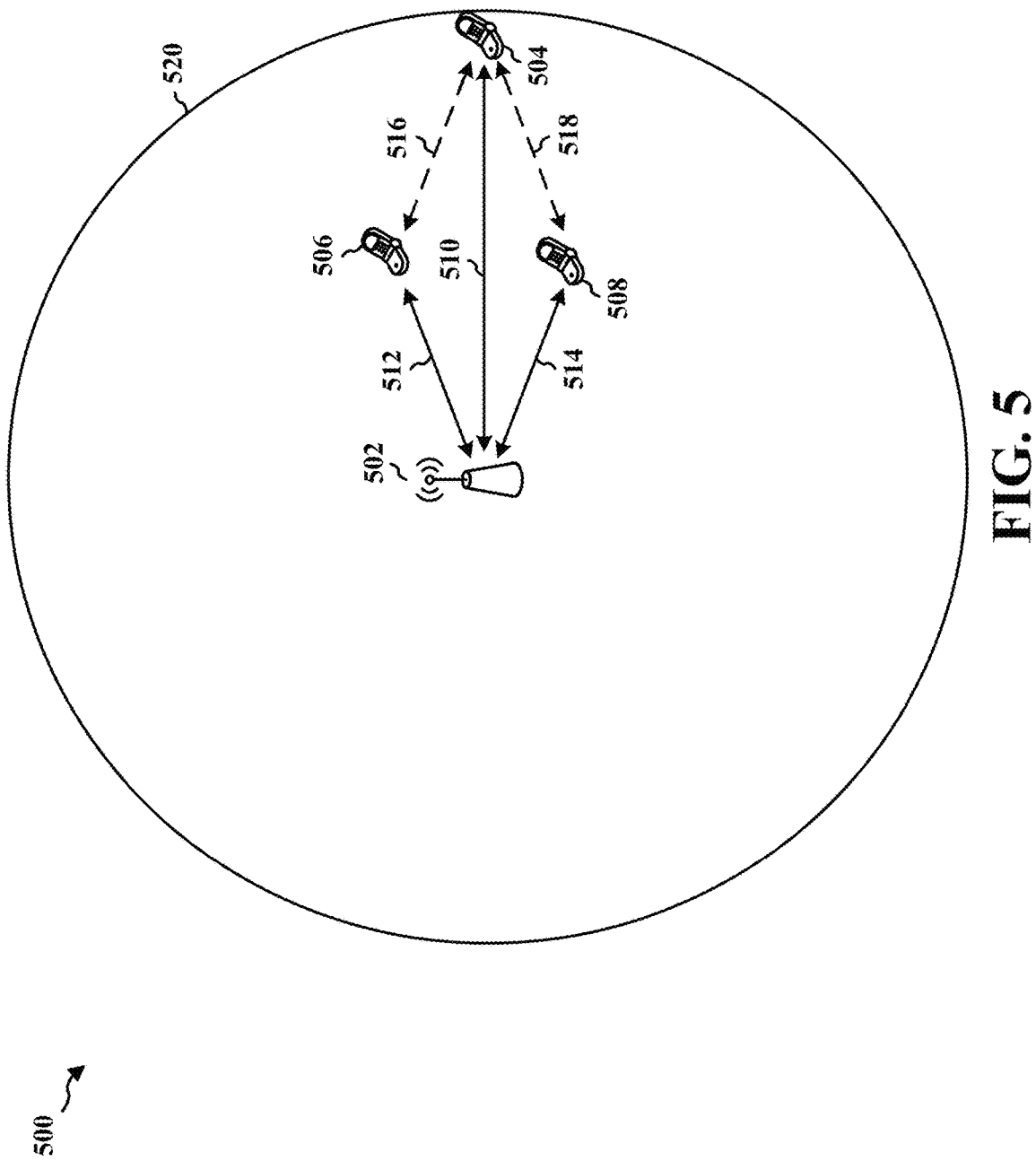
FIG. 5 is a diagram illustrating a cell of a wireless communication system.

FIG. 5 is a diagram illustrating a cell 500 of a wireless communication system in accordance with various aspects of the disclosure. FIG. 5 includes eNB 502, UE 504, and relay UEs 506 and 508. Although cell 500 includes one UE (e.g., UE 504) and two relay UEs (e.g., relay UEs 506, 508) for ease of illustration, it should be understood that cell 500 may include a different number of UEs and relay UEs than those depicted in FIG. 5 in other aspects. In FIG. 5, the perimeter of the circle 520 represents the edge of the cell 500, such that a communication device (e.g., UE 504 and/or relay UEs 506 and 508) within the circle 520 is considered to be within communication range of the eNB 502. As shown in FIG. 5, UE 504 is in communication with the eNB 502 via radio link 510, relay UE 506 is in communication with the eNB 502 via radio link 512, and relay UE 508 is in communication with the eNB 502 via radio link 514.

In an aspect, if the UE 504 has a capability to communicate with one or more relay UEs, the UE 504 may establish a radio link 516 with the relay UE 506 and may communicate with the eNB 502 through the radio link 516. As another example, the UE 504 may establish a radio link 518 with the relay UE 508 and may communicate with the eNB 502 through the radio link 518. Therefore, in the configuration of FIG. 5, the relay UEs 506 and 508 may each be a UE configured to serve as a relay node between the eNB 502 and the UE 504.

In an aspect, the UE 504 may be configured to transmit information to the eNB 502 indicating a capability to communicate with one or more relay UEs. For example, the UE 504 may transmit such information to the eNB 502 through the radio link 510 when the UE 504 approaches the edge of the cell 500. In an aspect, the information indicating a capability to communicate with one or more relay UEs may indicate that the UE 504 can perform device-to-device (D2D) communication and/or D2D discovery with one or more relay UEs.

In an aspect, the UE 504 may perform one or more measurements of the radio link 510 and may transmit the one or more measurements to the eNB 502. In such aspect, the eNB 502 may transmit configuration information to the UE 504 in response to reception of the one or more measurements. For example, the configuration information may indicate the circumstances under which the UE 504 should perform a discovery procedure for identifying one or more relay UEs (e.g., relay UEs 506, 508) in the cell 500. As such, as the UE 504 approaches the edge of the cell 500, the configuration information enables the UE 504 to start searching for relay UEs (e.g., relay UEs 506, 508) before the eNB 502 is no longer able to communicate with the relay UE. In other words, the configuration information enables the UE 504 to start searching for relay UEs before the radio link 510 between the UE 504 and the eNB 502 is lost.

In an aspect, the eNB 502 may include the configuration information in a radio resource control (RRC) reconfiguration message transmitted to the UE 504 or in a system information block (SIB) transmitted to the UE 504. In an aspect, the configuration information may include a reference signal received power (RSRP) threshold and hysteresis. In such aspect, the UE 504 may perform the discovery procedure to identify relay UEs in the cell 500 when an RSRP of the radio link 510 between the UE 504 and the eNB 502 is less than or equal to the RSRP threshold. In another aspect, the configuration information may include a command to perform the discovery procedure to identify relay UEs in the cell 500.

In an aspect, after the UE 504 has identified one or more relay UEs (e.g., relay UEs 506, 508), the UE 504 may select a relay UE from among the one or more identified relay UEs. In an aspect, the UE 504 may select a relay UE based on the configuration information. In such aspect, the configuration information may indicate a threshold backhaul link quality between a relay UE and the eNB 502 and/or a threshold link quality between a relay UE and the UE 504. For example, if the UE 504 performs a discovery procedure and identifies relay UEs 506, 508, the UE 504 may select the relay UE that has a backhaul link quality exceeding the threshold backhaul link quality indicated in the configuration information. The backhaul link quality for the relay UE 506 may be the quality of the radio link 512, and the backhaul link quality for the relay UE 508 may be the quality of the radio link 514. As another example, if the UE 504 performs a discovery procedure and identifies relay UEs 506, 508, the UE 504 may select the relay UE that has a link quality exceeding the threshold link quality included in the configuration information. The link quality for the relay UE 506 may be the quality of the radio link 516 and the link quality for the relay UE 508 may be the quality of the radio link 518. The UE 504 may then communicate with the eNB 502 through the radio link established with the selected relay UE. For example, if the UE 504 selects the relay UE 508, the UE 504 may communicate with the eNB 502 through the radio link 518 established with the relay UE 508. In an aspect, if the configuration information does not indicate a threshold backhaul link quality between a relay UE and the eNB 502 and/or a threshold link quality between a relay UE and the UE 504, the UE 504 may select any relay UE that has been discovered.

In an aspect, the UE 504 may detect a failure of the radio link 510 between the UE 504 and the eNB 502. For example, the UE 504 may detect the failure of the radio link 510 in response to expiration of timer T310. In this aspect, the configuration information enables the UE 504 to perform the discovery procedure upon detecting the failure of the radio link 510 or as soon as the UE 504 starts searching for another cell after detecting the failure of the radio link 510.

Figure 6:
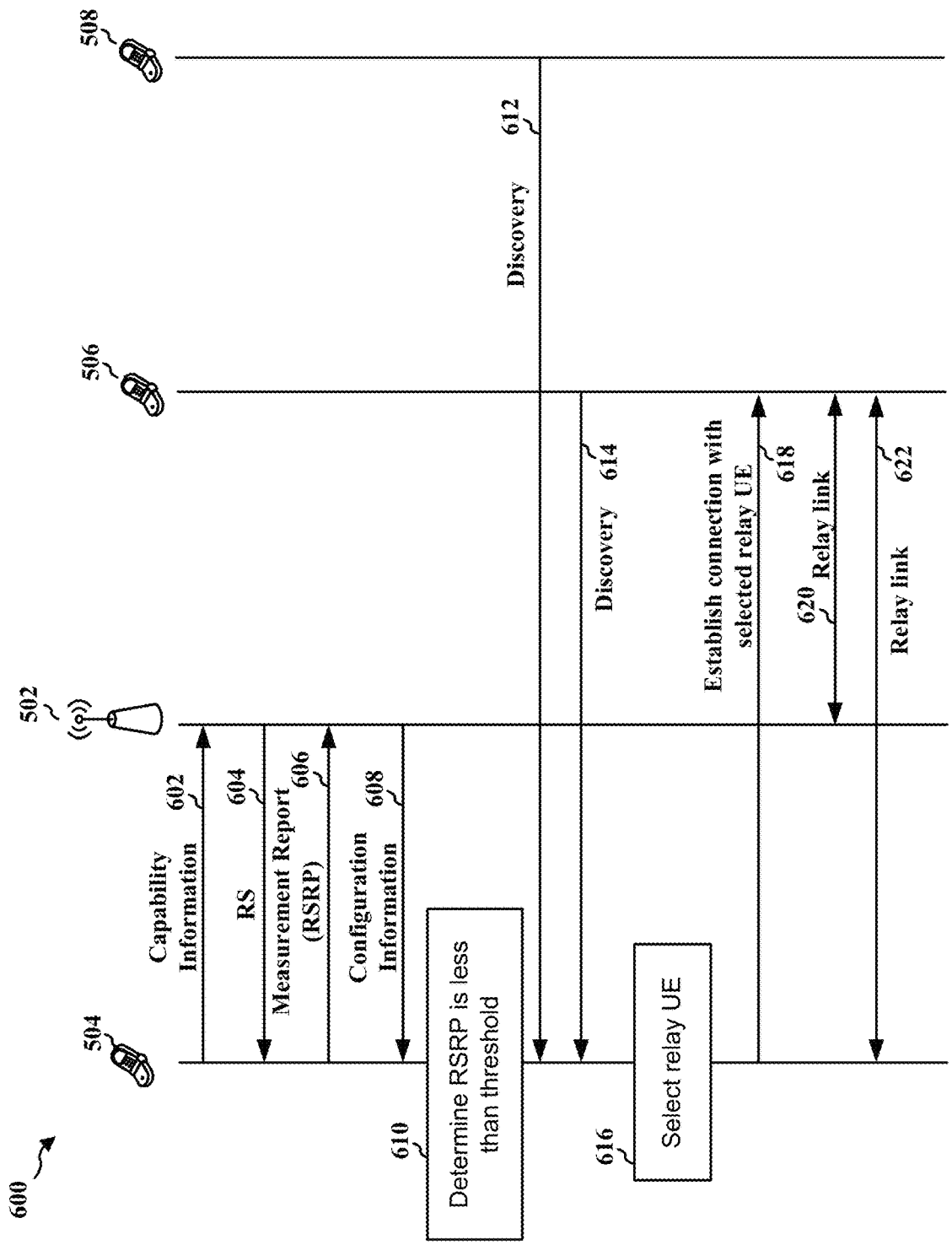
FIG. 6 is a call flow diagram illustrating a UE selecting and communicating with a relay UE.

FIG. 6 is a call flow diagram illustrating a UE selecting and communicating with a relay UE. A UE and a base station may exchange information prior to a failure of a radio link. For example, UE 504 may transmit capability information 602 to the eNB 502 to inform eNB 502 that UE 504 is configured for relay related D2D communication. The capability information may indicate that UE 504 is configured with radio resources to communicate with one or more relay UEs (e.g., 506, 508). The capability information may specify that the UE 504 may use sidelink communications (e.g., via such as PSBCH, PSDCH, PSSCH, PSCCH) to perform device-to-device (D2D) communication and/or D2D discovery with one or more relay UEs (e.g., 506, 508).

In turn an eNB 502 may transmit configuration information 604 to UE 504. The configuration information may provide one or more measurement threshold values (e.g., RSRP, RSRQ) to indicate UE 504 to perform a discovery procedure for identifying one or more relay UEs (e.g., relay UEs 506, 508). As an example, UE 504 may receive RS 606 (e.g., DL-RS, CSI-RS, UE-RS, FIG. 2A) from eNB 502 and based on RS, UE 504 may calculate and report RSRP 608 measurement back to eNB 502. Based on the received RSRP measurement, eNB may transmit configuration information 604 to UE 504 with a RSRP threshold value to indicate to UE 504 to perform discovery procedure when RSRP drops below the threshold value.

It should be appreciated that other measurements and indicators may be provided. For example, instead or RSRP RSRQ may have been the measure value. Likewise, the configuration information may have included other indicators such as a hysteresis or persistence (stay) that may indicate to the UE not to perform a discovery procedure until the measurement (e.g., RSRP, RSRQ) remains below the threshold. Further, it should be appreciated that eNB may provide the configuration information as part of standard communication. For example, eNB may be included the configuration in an RRC or an SIB.

When UE 504 determines that the RSRP drops lower than the threshold, UE 504 may start searching for relay UEs (e.g., 506, 508) before the radio link is lost. UE 504 may perform a discovery procedure to determine available relay UEs. For example, UE 504 may be position out the periphery of cell 500 and out of coverage. As such, UE 504 would determine that RSRP is below the threshold 610. In response the determination that RSRP is below the threshold 610, UE 504 performs discovery procedure (e.g., discovery 612, discovery 614) which indentifies that UE 506 and UE 508 as suitable candidates that may be configured as relay UEs.

In some aspects, a UE may base relay UE selection on the respective measurements of each relay UE candidate. For example, UE 504 may compare the RSRP and hysteresis measurements of UE 508 from discovery 612 and RSRP and hysteresis measurements of UE 506 from discovery 614 to determine UE 506 is a more favorable relay UE candidate. In this instance, UE 504 may select UE 506 as the relay UE (e.g., select relay UE 616).

In addition, a UE may take into account backhaul link quality and select a UE candidate based on criteria that has the best radio link quality. For instance, UE may take into account the sidelink RSRP received from each UE candidate as well as any reported RSRP measurements reported between candidate UEs and an eNB. For example, in one scenario UE 504 may be outside cell 500 and out of coverage, UE 508 may be positioned between UE 504 and eNB but near the periphery of cell 500, and UE 506 may be positioned between UE 508 and eNB. In this scenario UE 504's discovery procedure indicates that UE 508 has a strong sidelink RSRP but a weak RSRP link to eNB 502, whereas the sidelink RSRP of EU 506 is not as strong as EU 508 but EU 506 has a stronger RSRP link to eNB 502. Based on these measurements it may be favorable for UE to select UE 506 as the relay UE 506 with less chances of lost signal even though the UE 506's sidelink RSRP is lower than UE 508.

Once UE 504 selects UE 506 (e.g., select relay UE 616) UE 504 establishes the connection with UE 506. That is, UE 506 maintains radio link with eNB 502 (e.g. relay link 620) and relays communication using sidelink communications (e.g., via such as PSBCH, PSDCH, PSSCH, PSCCH) to UE 504 (e.g., relay link 622). For example, UE 506 may receive packets from eNB 502 via relay link 620 and transmit the same packets to UE 504 via relay link 622. Likewise, UE 506 may receive packets from UE 504 via relay link 622 and transmit the same packet to eNB 502 via relay link 620.

Figure 7:
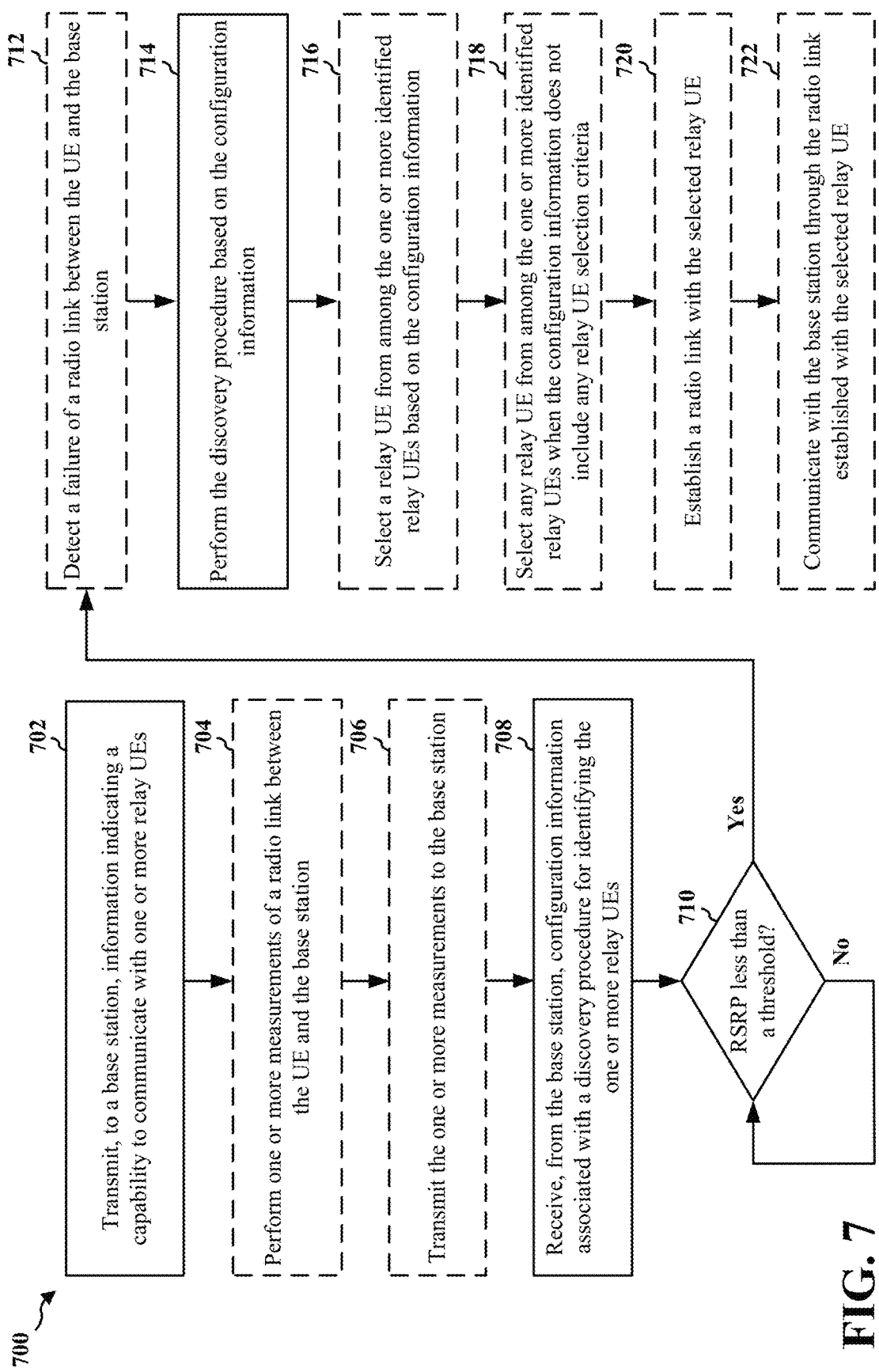
FIG. 7 is a flowchart of a method of wireless communication.

FIG. 7 is a flowchart 600 of a method of wireless communication. The method may be performed by a UE (e.g., the UE 504, the apparatus 702/702'). It should be understood that the operations indicated with dotted lines in FIG. 6 represent optional operations.

In an aspect, at 602, the UE transmits, to a base station, information indicating a capability to communicate with one or more relay UEs. For example, UE 504 may transmit UE 504 capability information to eNB 502 that indicates UE 504 has a capability to communicate with one or more relay UEs.

In an aspect, at 604, the UE performs one or more measurements of a radio link between the UE and the base station. In some instances, one or more measurements of radio link 510 may indicate that UE 504 is approaching the edge of cell 500.

In an aspect, at 606, the UE transmits the one or more measurements to the base station. For example, in some instances, the one or more measurements may include a reference signal received power (RSRP).

In an aspect, at 608, the UE receives, from the base station, configuration information associated with a discovery procedure for identifying the one or more relay UEs. For example, UE 504 may receive configuration information in a radio resource control (RRC) reconfiguration message or in a system information block (SIB) that includes a reference signal received power (RSRP) threshold and hysteresis.

In an aspect, at 610, the UE detects a failure of a radio link between the UE and the base station. In some instances, UE 504 may leave the communication range of the eNB 502 causing the radio link 510 to drop. In such circumstances, UE 504 may detect that the radio link 510 had dropped in response to expiration of timer T310.

In an aspect, at 612, the UE performs the discovery procedure based on the configuration information. In some instances, for example, the UE 504 may perform the discovery procedure to identify relay UEs in the cell 500 when an RSRP of the radio link 510 between the UE 504 and the eNB 502 is less than or equal to the RSRP threshold.

In an aspect, at 614, the UE selects a relay UE from among the one or more identified relay UEs based on the configuration information. For example, UE 504 may select the relay UE that has a backhaul link quality exceeding the threshold backhaul link quality indicated in the configuration information. In this instance, the backhaul link quality for the relay UE 506 may be the quality of the radio link 512, and the backhaul link quality for the relay UE 508 may be the quality of the radio link 514. In another example, UE 504 may select the relay UE that has a link quality exceeding the threshold link quality included in the configuration information. In this instance, the link quality for the relay UE 506 may be the quality of the radio link 516 and the link quality for the relay UE 508 may be the quality of the radio link 518.

In an aspect, at 616, the UE selects any relay UE from among the one or more identified relay UEs when the configuration information does not include any relay UE selection criteria. For example, if the discovery procedure identifies relay UE 506 or relay UE 508 but the configuration information does not indicate a threshold backhaul link quality between a relay UE and the eNB 502 and/or a threshold link quality between a relay UE and the UE 504, the UE 504 may select either relay UE 506 or relay UE 508.

In an aspect, at 618, the UE establishes a radio link with the selected relay UE. For example, once UE 504 identifies and selects relay 506, the UE 504 may establish a radio link 516 with the relay UE 506.

Finally, in an aspect, at 620, the UE communicates with the base station through the radio link established with the selected relay UE. That is, upon establishing a radio link 516 with the relay UE 506 UE 504 may communicate with the eNB 502 through the radio link 516.

FIG. 7 is a conceptual data flow diagram 700 illustrating the data flow between different means/components in an exemplary apparatus 702. The apparatus may be a UE. The apparatus includes a reception component 704, a measurement component 706, a radio link failure detection component 708, a discovery component 710, a relay UE selection component 712, a radio link establishment component 714, and a transmission component 716. In one aspect, the transmission component 716 is configured to transmit, to a base station, information that indicates a capability to communicate with relay UEs. In addition, reception component 704 is configured to receive, from the base station, configuration information associated with a discovery procedure in order to identify the relay UEs. In addition, discovery component 710 is configured to perform a discovery procedure based on the received configuration information.

In one configuration, measurement component 706 is configured to perform measurements of a radio link between the UE and the base station. In addition, transmission component 716 is configured to transmit the measurements to the base station. In one configuration, the configuration information comprises a reference signal received power (RSRP) threshold and hysteresis. In such a configuration, discovery component 710 is configured to perform a discovery procedure when an RSRP of the radio link between the UE and the base station is less than or equal to the RSRP threshold. In one configuration, the configuration information comprises a command for discovery component 710 to perform the discovery procedure. In one configuration, reception component 704 is configured to receive the configuration information in a radio resource control (RRC) reconfiguration message or a system information block (SIB). In on configuration, relay UE selection component 712 is configured to select a relay UE from identified relay UEs based on the received configuration information. In addition, radio link establishment component 714 is configured to establish a radio link with the selected relay UE. In addition, transmission component 716 is configured to communicate with the base station through the radio link established with the selected relay UE. In one configuration, the received configuration information enables the discovery component 710 to perform the discovery procedure prior to a failure of a radio link between the UE and the base station. In one configuration, radio link failure detection component 708 is configured to detect a failure of a radio link between the UE and the base station. In such a configuration, the received configuration information enables the discovery component 710 to perform a discovery procedure upon detecting the failure of the radio link between the UE and the base station. In one configuration, relay UE selection component 712 is configured to select any relay UE identified relay UEs from the discovery procedure performed by discovery component 710 when the configuration information does not include any relay UE selection criteria.

The apparatus may include additional components that perform each of the blocks of the algorithm in the aforementioned flowchart of FIG. 6. As such, each block in the aforementioned flowchart of FIG. 6 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
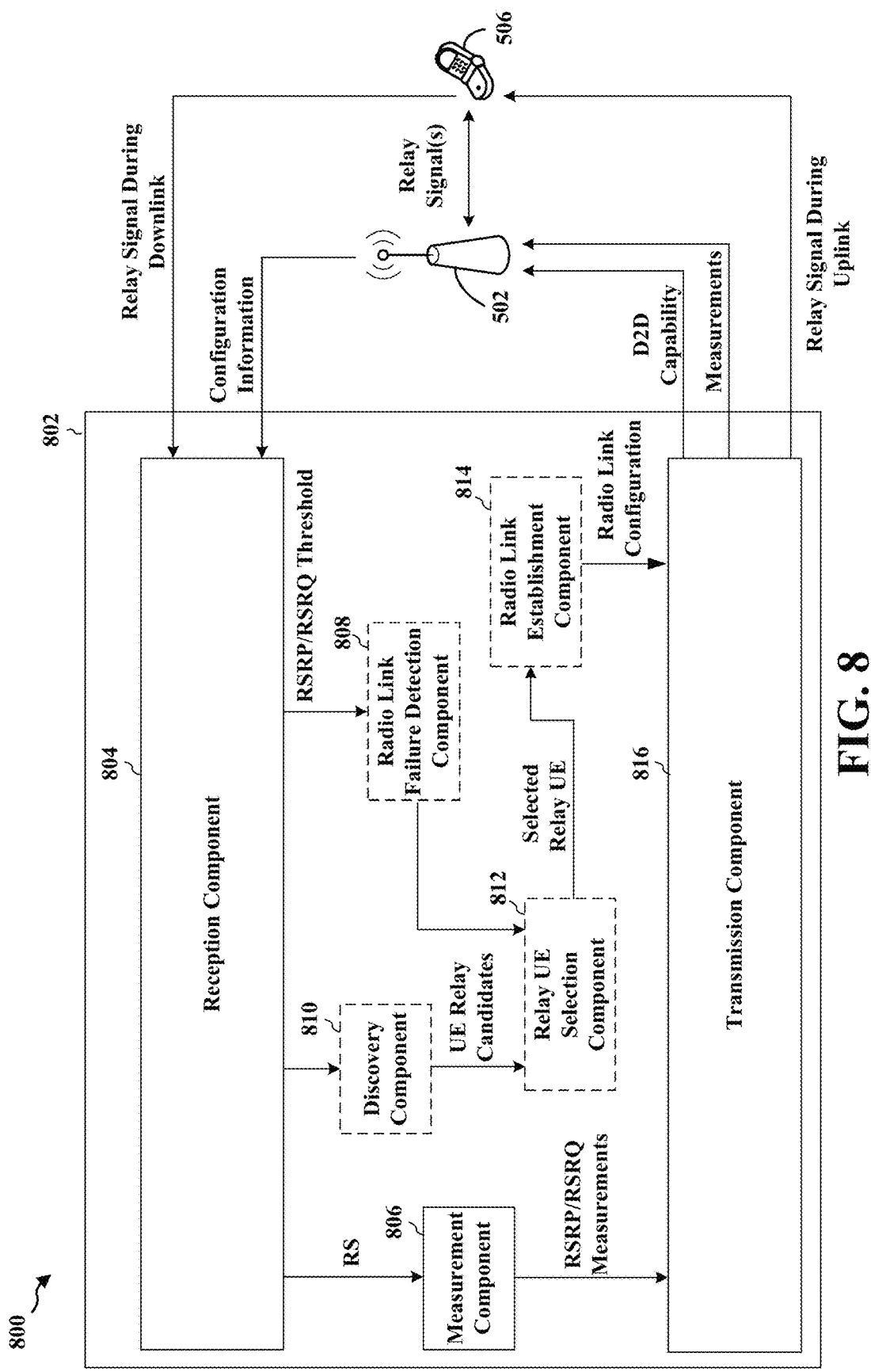
FIG. 8 is a conceptual data flow diagram illustrating the data flow between different means/components in an exemplary apparatus.
Figure 9:
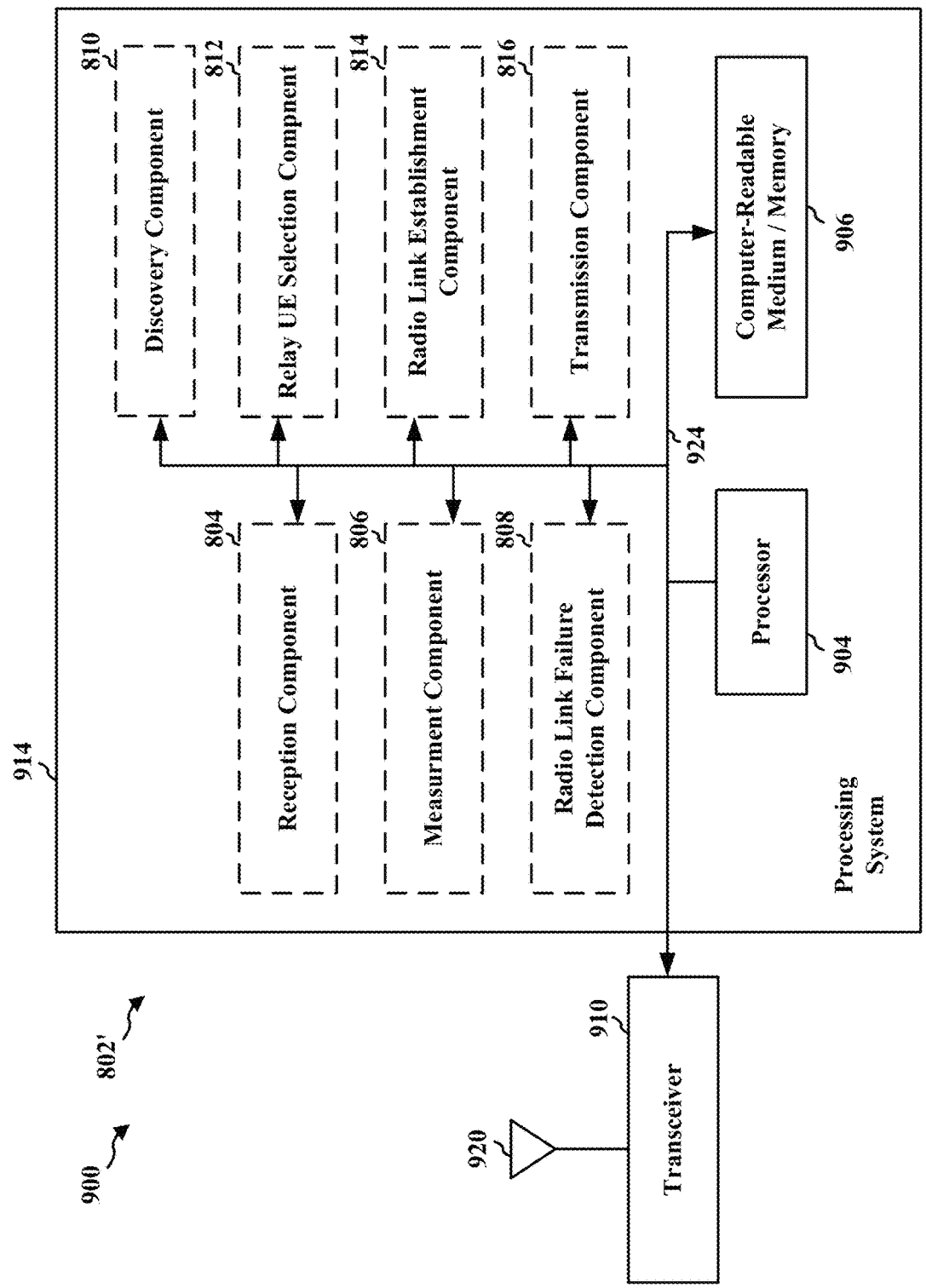
FIG. 9 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, 710, 712, 714, and 716 and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 804. In addition, the transceiver 810 receives information from the processing system 814, specifically the transmission component 816, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system 814 further includes at least one of the components 704, 706, 708, 708, 710, 712, 714, and 716. The components may be software components running in the processor 804, resident/stored in the computer readable medium/memory 806, one or more hardware components coupled to the processor 804, or some combination thereof. The processing system 814 may be a component of the UE 350 and may include the memory 360 and/or at least one of the TX processor 368, the RX processor 356, and the controller/processor 359.

In one configuration, the apparatus 702/702' for wireless communication includes means for transmitting, to a base station, information indicating a capability to communicate with one or more relay UEs. In addition, the apparatus includes means for receiving, from the base station, configuration information associated with a discovery procedure for identifying the one or more relay UEs. In addition, the apparatus includes means for performing the discovery procedure based on the configuration information. In one configuration, the apparatus may further include means for performing one or more measurements of a radio link between the UE and the base station. In addition, the apparatus includes means for transmitting the one or more measurements to the base station. In one configuration, the configuration information comprises a reference signal received power (RSRP) threshold and hysteresis. In such a configuration the UE performs the discovery procedure when an RSRP of the radio link between the UE and the base station is less than or equal to the RSRP threshold. In one configuration, the configuration information comprises a command to perform the discovery procedure. In one configuration, the configuration information is received in a radio resource control (RRC) reconfiguration message or a system information block (SIB). In one configuration, the apparatus may further include means for selecting a relay UE from among the one or more identified UEs based on the configuration information. In addition, the apparatus includes means for establishing a radio link with the selected relay UE. In addition, the apparatus includes means for communicating with the base station through the radio link established with the selected relay UE. In one configuration, the configuration information enables the discovery procedure to be performed prior to a failure of a radio link between the UE and the base station. In one configuration, the apparatus may further include means for detecting a failure of a radio link between the UE and the base station. In addition, the configuration information enables the discovery procedure to be performed upon detecting the failure of the radio link between the UE and the base station.

In one configuration, the apparatus may further include means for selecting any relay UE from among the one or more identified UEs when the configuration information does not include any relay UE selection criteria. The aforementioned means may be one or more of the aforementioned components of the apparatus 702 and/or the processing system 814 of the apparatus 702' configured to perform the functions recited by the aforementioned means. As described supra, the processing system 814 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

It is understood that the specific order or hierarchy of blocks in the processes/flowcharts disclosed is an illustration of exemplary approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication for a user equipment (UE) comprising:
    transmitting, to a serving base station of the UE, information indicating a capability to communicate with relay UEs;
    transmitting, to the serving base station, one or more measurements of a radio link between the UE and the serving base station;
    receiving, from the serving base station, configuration information generated in response to the one or more measurements, wherein the configuration information is (a) associated with a discovery procedure for identifying relay UEs and (b) includes a threshold backhaul link quality;

identifying, by the UE, two or more relay UEs by performing the discovery procedure based on the configuration information received from the serving base station; and selecting, by the UE, a relay UE from among the two or more relay UEs identified via the performing of the discovery procedure, and wherein the selecting of the relay UE is based at least on a determination that the selected relay UE has a backhaul link quality exceeding the threshold backhaul link quality included in the configuration information received from the serving base station.

2. The method of claim 1, further comprising:
performing the one or more measurements of the radio link between the UE and the serving base station.

3. The method of claim 2, wherein the configuration information comprises a reference signal received power (RSRP) threshold and hysteresis, and wherein the UE performs the discovery procedure when an RSRP of the radio link between the UE and the serving base station is less than or equal to the RSRP threshold.

4. The method of claim 2, wherein the configuration information comprises a command to perform the discovery procedure.

5. The method of claim 4, wherein the configuration information is received in a radio resource control (RRC) reconfiguration message or a system information block (SIB).

6. The method of claim 1, further comprising:
establishing a radio link with the selected relay UE; and
communicating with the serving base station through the radio link established with the selected relay UE.

7. The method of claim 1, wherein the configuration information enables the discovery procedure to be performed prior to a failure of a radio link between the UE and the serving base station.

8. The method of claim 1, further comprising:
detecting a failure of a radio link between the UE and the serving base station,
wherein the configuration information enables the discovery procedure to be performed upon detecting the failure of the radio link between the UE and the serving base station.

9. The method of claim 1, further comprising selecting any relay UE from among the two or more identified relay UEs when the configuration information does not include any relay UE selection criteria.

10. A user equipment (UE) comprising:
means for transmitting, to a serving base station of the UE, information indicating a capability to communicate with relay UEs, and one or more measurements of a radio link between the UE and the serving base station;
means for receiving, from the serving base station, configuration information generated in response to the one or more measurements, wherein the configuration information is (a) associated with a discovery procedure for identifying relay UEs and (b) includes a threshold backhaul link quality;
means for identifying two or more relay UEs by performing the discovery procedure based on the configuration information received from the serving base station; and
means for selecting a relay UE from among the two or more relay UEs identified via the performing of the discovery procedure, and wherein the selecting of the relay UE is based at least on a determination that the selected relay UE has a backhaul link quality exceeding the threshold backhaul link quality included in the configuration information received from the serving base station.

11. The UE of claim 10, further comprising:
means for performing the one or more measurements of the radio link between the UE and the serving base station.

12. The UE of claim 11, wherein the configuration information comprises a reference signal received power (RSRP) threshold and hysteresis, and wherein the UE performs the discovery procedure when an RSRP of the radio link between the UE and the serving base station is less than or equal to the RSRP threshold.

13. The UE of claim 11, wherein the configuration information comprises a command to perform the discovery procedure.

14. The UE of claim 13, wherein the configuration information is received in a radio resource control (RRC) reconfiguration message or a system information block (SIB).

15. The UE of claim 10, further comprising:
means for establishing a radio link with the selected relay UE; and
means for communicating with the serving base station through the radio link established with the selected relay UE.

16. The UE of claim 10, wherein the configuration information enables the discovery procedure to be performed prior to a failure of a radio link between the UE and the serving base station.

17. The UE of claim 10, further comprising:
means for detecting a failure of a radio link between the UE and the serving base station,
wherein the configuration information enables the discovery procedure to be performed upon detecting the failure of the radio link between the UE and the serving base station.

18. The UE of claim 10, further comprising means for selecting any relay UE from among the two or more identified relay UEs when the configuration information does not include any relay UE selection criteria.

19. A user equipment (UE) comprising:
a memory; and
at least one processor coupled to the memory and configured to:
transmit, to a serving base station of the UE, information indicating a capability to communicate with relay UEs;
transmit, to the serving base station, one or more measurements of a radio link between the UE and the serving base station;
receive, from the serving base station, configuration information generated in response to the one or more measurements, wherein the configuration information is (a) associated with a discovery procedure for identifying relay UEs and (b) includes a threshold backhaul link quality;
identify two or more relay UEs by performing the discovery procedure based on the configuration information received from the serving base station; and
select a relay UE from among the two or more relay UEs identified via the performing of the discovery procedure, the selection of the relay UE to be based at least on a determination that the selected relay UE has a backhaul link quality exceeding the threshold backhaul link quality included in the configuration information received from the serving base station.

20. The UE of claim 19, wherein the at least one processor is further configured to:
perform one or more measurements of a radio link between the UE and the serving base station; and
transmit the one or more measurements to the serving base station.

21. The UE of claim 20, wherein the configuration information comprises a reference signal received power (RSRP) threshold and hysteresis, and wherein the at least one processor is configured to perform the discovery procedure when an RSRP of the radio link between the UE and the serving base station is less than or equal to the RSRP threshold.

22. The UE of claim 20, wherein the configuration information comprises a command to perform the discovery procedure.

23. The UE of claim 22, wherein the configuration information is received in a radio resource control (RRC) reconfiguration message or a system information block (SIB).

24. The UE of claim 19, wherein the at least one processor is further configured to:
establish a radio link with the selected relay UE; and
communicate with the serving base station through the radio link established with the selected relay UE.

25. The UE of claim 19, wherein the configuration information enables the discovery procedure to be performed prior to a failure of a radio link between the UE and the serving base station.

26. The UE of claim 19, wherein the at least one processor is further configured to:
detect a failure of a radio link between the UE and the serving base station,
wherein the configuration information enables the discovery procedure to be performed upon detecting the failure of the radio link between the UE and the serving base station.

27. The UE of claim 19, wherein the at least one processor is further configured to select any relay UE from among the two or more identified relay UEs when the configuration information does not include any relay UE selection criteria.

28. A non-transitory computer-readable medium of a user equipment (UE) storing computer executable code for wireless communication, comprising code for:
transmitting, to a serving base station of a UE (user equipment), information indicating a capability to communicate with relay UEs;
transmitting, to the serving base station, one or more measurements of a radio link between the UE and the serving base station;
receiving, from the serving base station, configuration information generated in response to the one or more measurements, wherein the configuration information is (a) associated with a discovery procedure for identifying relay UEs and (b) includes a threshold backhaul link quality;
identifying, by the UE, two or more relay UEs by performing the discovery procedure based on the configuration information received from the serving base station; and
selecting, by the UE, a relay UE from among the two or more relay UEs identified via the performing of the discovery procedure, and wherein the selecting of the relay UE is based at least on a determination that the selected relay UE has a backhaul link quality exceeding the threshold backhaul link quality included in the configuration information received from the serving base station.

* * * * *